United States Patent
Potolicchio

(10) Patent No.: US 11,555,425 B2
(45) Date of Patent: Jan. 17, 2023

(54) LUBRICATION CONTROL IN INTERNAL COMBUSTION ENGINES

(71) Applicant: Miguel Alfonso Potolicchio, Parkland, FL (US)

(72) Inventor: Miguel Alfonso Potolicchio, Parkland, FL (US)

( * ) Notice: Subject to any disclaimer, the term of this patent is extended or adjusted under 35 U.S.C. 154(b) by 162 days.

(21) Appl. No.: 15/677,595

(22) Filed: Aug. 15, 2017

(65) Prior Publication Data

US 2017/0342876 A1  Nov. 30, 2017

Related U.S. Application Data

(63) Continuation-in-part of application No. 15/375,159, filed on Dec. 11, 2016, now Pat. No. 10,443,457.

(60) Provisional application No. 62/266,551, filed on Dec. 11, 2015.

(51) Int. Cl.
| | |
|---|---|
| *F01M 1/02* | (2006.01) |
| *F01M 1/16* | (2006.01) |
| *F01M 11/02* | (2006.01) |
| *F01M 9/10* | (2006.01) |
| *F16K 15/04* | (2006.01) |
| *F01M 1/08* | (2006.01) |

(52) U.S. Cl.
CPC ........... *F01M 1/02* (2013.01); *F01M 1/08* (2013.01); *F01M 1/16* (2013.01); *F01M 9/102* (2013.01); *F01M 9/108* (2013.01); *F01M 11/02* (2013.01); *F16K 15/044* (2013.01)

(58) Field of Classification Search
CPC .. F01M 1/02; F01M 1/08; F01M 1/16; F01M 9/102
See application file for complete search history.

(56) References Cited

U.S. PATENT DOCUMENTS

| | | | | |
|---|---|---|---|---|
| 3,343,564 A | * | 9/1967 | Peeples | F16K 15/044 137/539 |
| 3,743,053 A | * | 7/1973 | Kuklewicz | F01M 11/0408 137/539 |
| 4,470,382 A | * | 9/1984 | Muto | F01L 1/245 123/195 HC |
| 4,776,430 A | * | 10/1988 | Rule | F01M 11/0408 137/539 |
| 5,589,059 A | * | 12/1996 | Semar | B01D 29/055 210/109 |
| 5,853,575 A | * | 12/1998 | Wydra | B01D 35/157 210/136 |
| 8,992,089 B2 | | 3/2015 | Raby | |
| 9,416,697 B2 | | 8/2016 | Raby | |
| 9,687,974 B2 | | 6/2017 | Raby | |
| 2016/0326923 A1 | | 11/2016 | Raby | |

\* cited by examiner

*Primary Examiner* — Kevin A Lathers
(74) *Attorney, Agent, or Firm* — Thomas K. Ziegler

(57) ABSTRACT

An adapter replaces a crankcase screw-on oil filter for an internal combustion engine and couples pressurized oil in the engine's crankcase with at least one external component. The adapter includes a valve that prevents backflow of oil from the external component to the crankcase.

2 Claims, 19 Drawing Sheets

LUBRICATION CONTROL IN INTERNAL COMBUSTION ENGINES

CROSS REFERENCE TO RELATED APPLICATIONS

This application is a continuation-in-part of Non-provisional U.S. patent application Ser. No. 15/375,159 filed Dec. 11, 2016, which claims the benefit of Provisional US Patent Application No. 62/266,551 filed Dec. 11, 2015, the entireties of which applications are incorporated by reference herein.

BACKGROUND INFORMATION

1. Field

The present disclosure generally relates to lubrication systems for internal combustion engines, and deals more particularly with controlling the flow of lubricating fluids in such engines.

2. Background

Internal combustion engines have various components such as pistons, shafts and related bearings that require lubrication in order to reduce friction and related wear. Lubrication of these components is typically achieved using a pressurized oil lubrication system having an oil pump that draws oil from an oil sump and pumps it through a series of internal engine passageways to the engine components requiring lubrication.

Adequate lubrication of engine components is more challenging in high-performance applications such as racing engines where rapid changes in engine RPMs and inertial side loads caused by extreme cornering and/or braking may result in oil deprivation and/or inadequate oil pressure, and/or higher oil operating temperatures. A variety of devices have been developed to deal with these problems, such as oil pressure compensators, remote oil filters and external oil coolers. These devices are sometimes provided as retrofit items, each requiring specialized mounting hardware, additional oil lines, fixtures, fittings, etc. unique to the vehicle application, all of which add to material and labor costs.

SUMMARY

The disclosure relates in general to engine lubrication systems, and more specifically to controls for improving oil lubrication of engine components, particularly in high-performance engine applications.

According to one aspect, a device is provided for controlling the flow of oil between the crankcase of an internal combustion engine and an external component. The device includes an adapter configured to be installed in an oil filter opening in the engine's crankcase. The adapter is coupled between the engine's oil pump and the external component to allow oil to be pumped from the crankcase to the external component. The adapter includes a valve for preventing backflow of oil from the external component to the crankcase.

According to another aspect, a lubrication system is provided for an internal combustion engine having a crankcase and an oil pump. The lubrication system includes at least one external component outside of the crankcase that is adapted to receive oil supplied by the oil pump, and an adapter. The adapter is attached to the crankcase and coupled between the oil pump and the external component. The adapter includes an outlet port coupled with the external component for supplying oil to the external component, an inlet port coupled with the external component for receiving oil from the external component, and a valve for controlling flow of oil between the oil pump and the external component.

According to a further aspect, a device is provided for coupling an oil lubrication system of an internal combustion engine with at least one external component, wherein the internal combustion engine includes a crankcase provided with a screw-on oil filter. The device comprises a screw-on adapter configured to replace the oil filter. The screw-on adapter includes an oil outlet port coupled with the external component for supplying oil to the external component, an oil inlet port coupled with the external component for receiving oil from the external component, and a valve for controlling flow of oil between the external component and the crankcase.

One of the advantages of the disclosed embodiments is that oil flow to engine components is controlled in a manner that prevents oil deprivation and related reductions in lubrication during certain engine operating conditions causing low oil pressure. Another advantage is that the adapter allows external components to be easily and quickly retrofitted to existing engine lubrication systems. A still further advantage is that the adapter may be simply installed in place of a screw-on oil filter in an engine crankcase. Another advantage is that the number of hoses, fittings, hardware, etc. required to add lubrication system components to an existing engine is substantially reduced.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
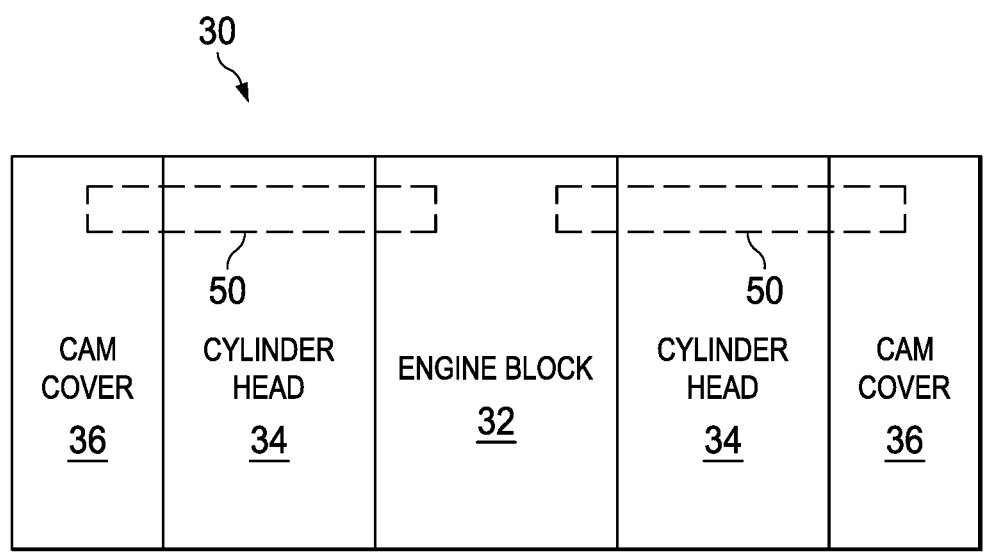
FIG. 1 is an illustration of an overall block diagram of an internal combustion engine.
Figure 2:
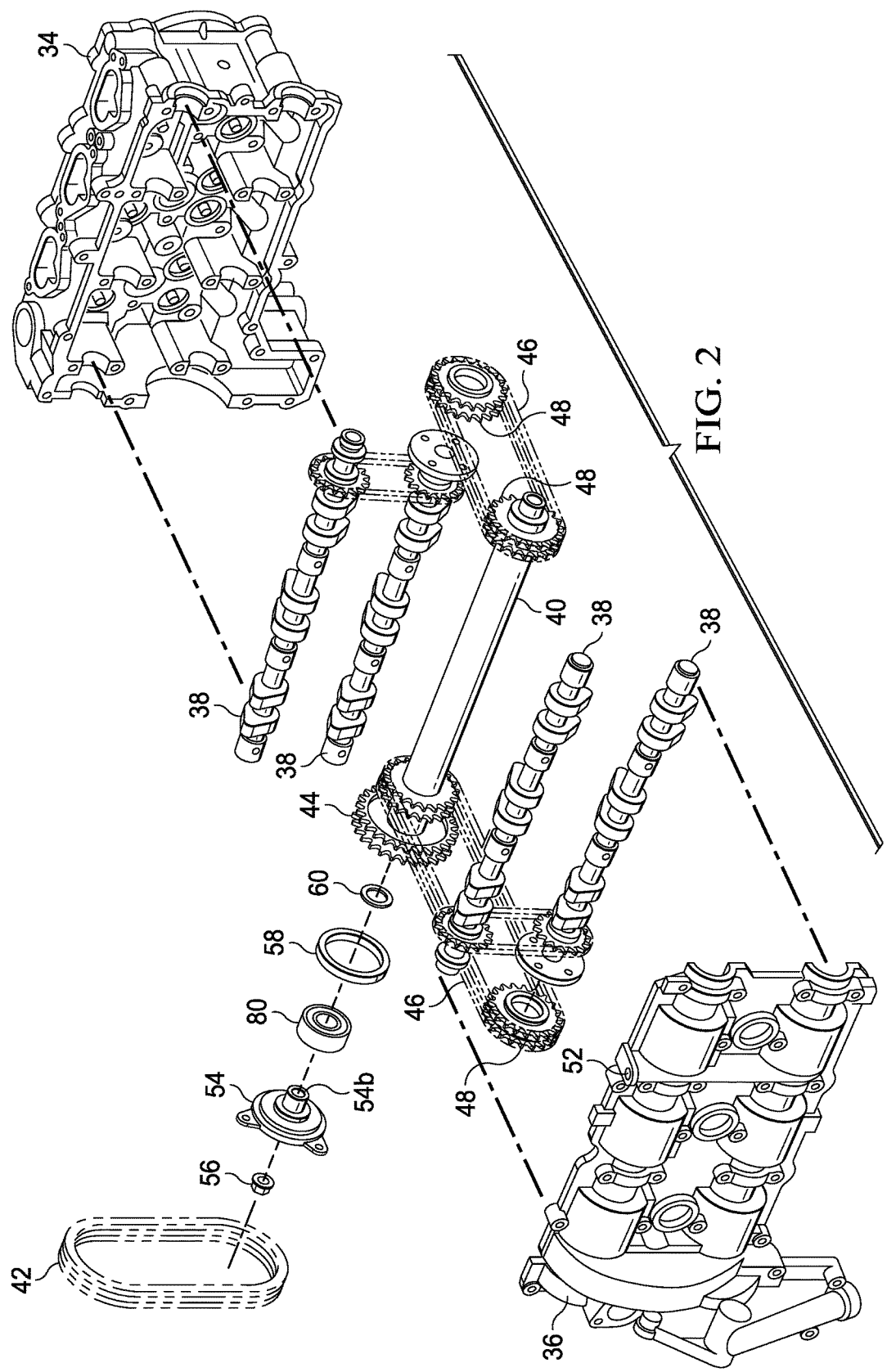
FIG. 2 is an illustration of a perspective, exploded view of certain components of the engine shown in FIG. 1.

Referring first to FIGS. 1 and 2, the disclosed embodiments relate to lubrication control in an internal combustion engine 30, which in the illustrated example, comprises an engine block 32 having horizontally opposed cylinder heads 34 provided with valve or cam covers 36. However, the disclosed lubrication control is suitable for use with a wide variety of other internal combustion configurations. Moving components of the engine 30 are lubricated by oil drawn from a later discussed oil sump and pumped into various oil galleys 50 and oil channels (not shown) in the engine 30. Referring particularly to FIG. 2, a layshaft, sometimes referred to as an intermediate shaft 40, transmits power from a crankshaft (not shown) of the engine 30 to intake and exhaust cams 38 which control opening and closing of intake and exhaust valves (not shown) in the cylinder heads 34. Power from the crankshaft is transmitted via a chain 42 to a sprocket 44 on one end of the layshaft 40. Power is transmitted from the layshaft 40 via a series of sprockets 48 and chains 46 to the cams 38.

Figure 5:
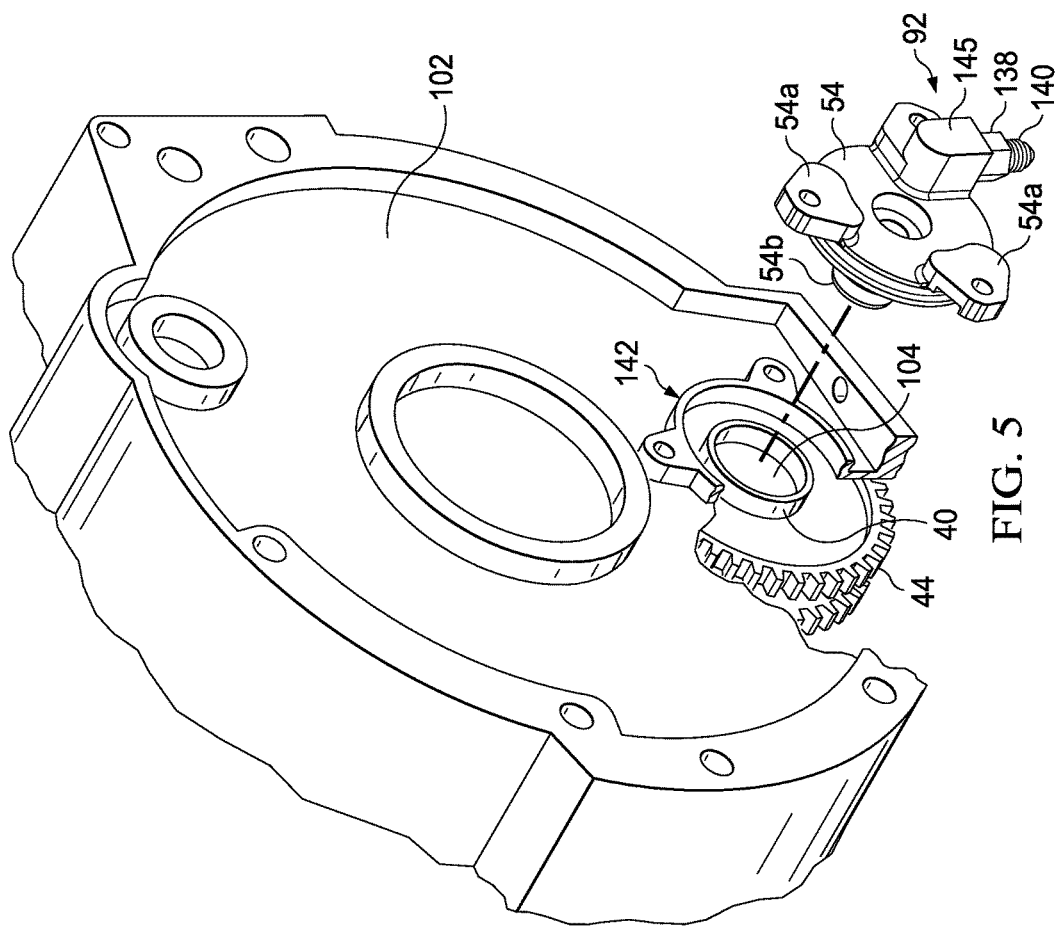
FIG. 5 is an illustration of a perspective, exploded view of the rear of the engine shown in FIGS. 1 and 2, portions of the engine case being broken away to reveal a layshaft and associated sprocket.

One end of the layshaft 40 is mounted for rotation on a bearing 80 located inside an open end 142 (FIG. 5) in the engine case cover 102. The open end 142 in the engine case cover 102 provides access to the end 104 of the layshaft 40. In one embodiment, the bearing 80 is sleeved over a post 54b on a flange 54 which effectively mounts one end of the layshaft 40 on the engine case cover 102. As best seen in FIG. 5, flange 54 includes ears 54a that are attached to the rear engine case cover 102 by suitable fasteners (not shown). Depending on the particular engine configuration, a seal 58, O-ring 60, snap ring (not shown), retention bolt 118 (see FIG. 9) and a nut 56 are used to retain and seal the flange 54 and bearing 80 assembly at the end of the layshaft 40.

Figure 3:
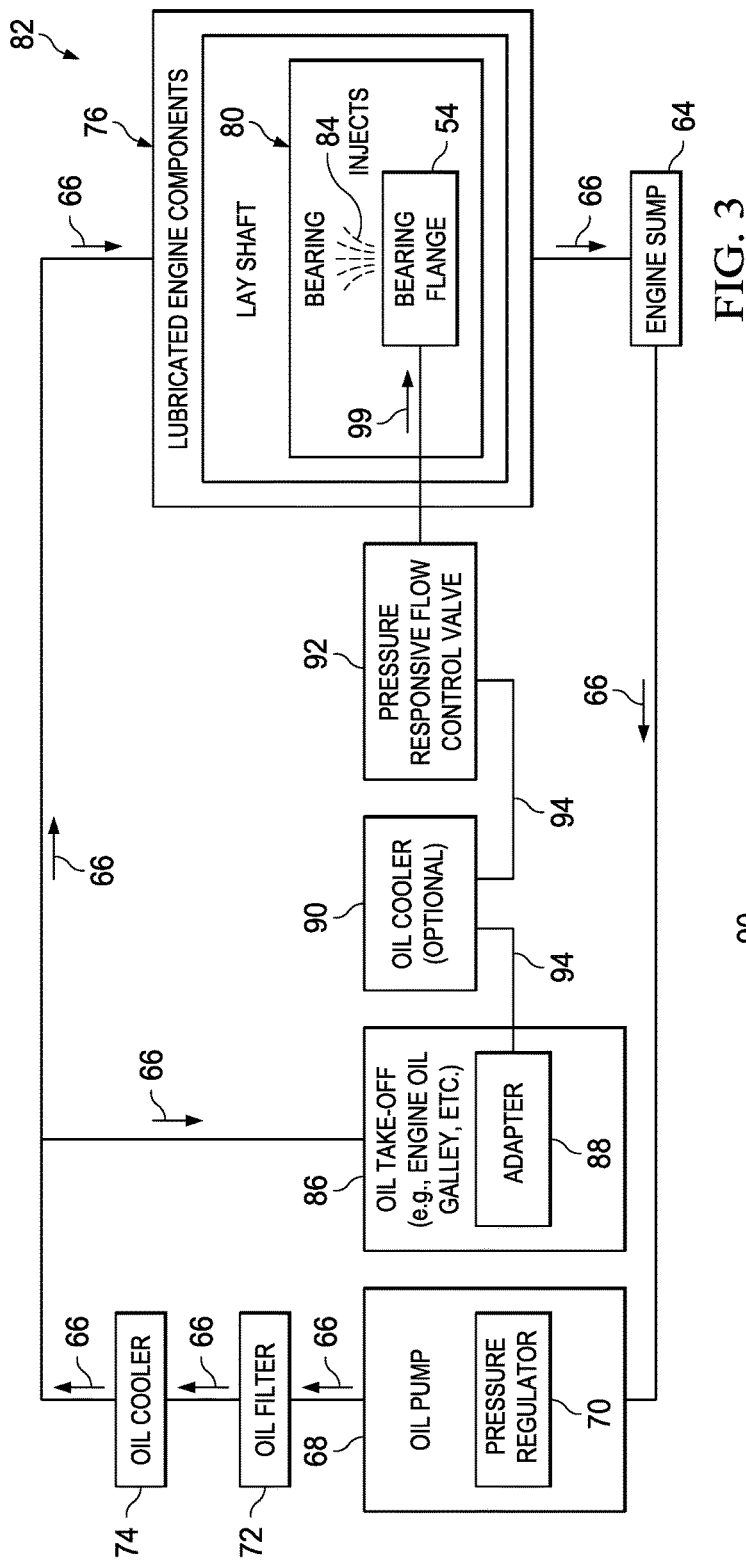
FIG. 3 is an illustration of a functional block diagram of a lubrication system for the engine of FIG. 1.

Attention is now directed to FIG. 3 which broadly illustrates a pressurized lubrication system 82 for lubricating various engine components 76, including but not limited to the bearing 80 on the end of the layshaft 40. Oil in an engine sump 64 is pumped through the lubrication system 82 by an oil pump 68 that includes a pressure regulator 70 which adjusts the oil pressure according to engine operating conditions and demand. Oil flows 66 from the engine sump 64 through the oil pump 68 through an oil filter 72 and oil cooler 74 to the lubricated engine components 76. The oil filter 72 may be integrated into the crankcase 178 (see FIG. 17) of the engine 30, or may be a separate, in-line type external oil filter 72. Oil derived from an oil take-off 86 is delivered via an oil delivery line 94 through an optional oil cooler 90 and a pressure responsive flow control valve 92 (hereinafter "flow control valve") before flowing 99 into the previously discussed flange 54.

As will be discussed below in more detail, oil flowing 99 through the flange 54 is injected 84 into the bearing 80 at a pressure that both lubricates the bearing 80 and flushes it of contaminants. The oil take-off 86 may comprise, for example and without limitation, an oil galley (FIG. 1) or similar source of oil that has been filtered and cooled by the oil filter 72 and oil cooler 74, before being circulated through the engine 30. Depending upon the location of the oil take-off 86, an adapter 88 may be used to connect the oil delivery line 94 to the location where the oil is sourced, such as a port 52 on the cam cover 36. As will be discussed later, the flow control valve 92 is normally closed and prevents flow 99 of oil to the flange 54 until oil pressure in the oil delivery line (which corresponds to the engine oil pressure) increases to a predetermined pressure level. When the pressure of the oil in the oil delivery line 94 reaches this predetermined pressure level, the flow control valve 92 opens, allowing oil to be injected into the bearing 80. Sudden opening of the control valve 92 effectively produces a spurt of oil into the bearing 80 which cleanses it of contaminant particles, following which a steady flow 99 continuously lubricates the bearing 80.

By delaying opening of the flow control valve 92 until engine oil pressure reaches a predetermined value, a possible drop in engine oil pressure is prevented due to diversion of oil through the flange 54 into the bearing 80. Normally, the flow control valve 92 opens shortly after engine start up when the engine oil pressure has reached a normal level. However there may be other engine operating conditions where engine oil pressure drops to an undesirably low level, in which case the flow control valve closes to prevent a further reduction in engine oil pressure due to diversion of oil through the flange 54.

Figure 4:
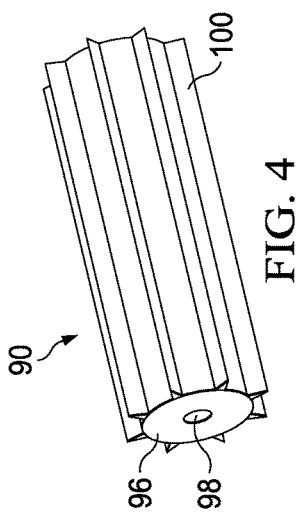
FIG. 4 is an illustration of a perspective view of an optional in-line oil cooler for use in the lubrication system shown in FIG. 3.

Referring now to FIG. 4, in one exemplary embodiment, the oil cooler 90 referred to above may comprise an in-line type oil cooler having a body 96 made of thermally conductive material which acts as a heat sink to remove thermal energy from oil flowing through a through hole 98 in the body 96. Optionally, the body 96 may include circumferentially spaced, external cooling fins 100 which function to transfer thermal energy from the body 96 to the surrounding environment.

Figure 6:
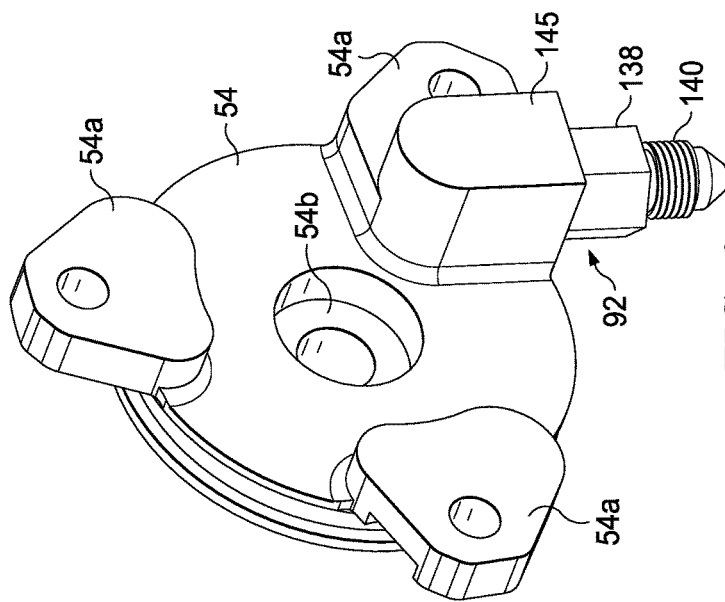
FIG. 6 is an illustration of a perspective view of the flange shown in FIG. 5.

FIGS. 5 and 6 illustrate additional details of the flange 54. Flange 54 includes three circumferentially spaced apart ears 54a adapted to receive fasteners (not shown) that mount the flange 54 on the engine case cover 102 at the rear of the engine 30. The flange 54 further includes a forwardly extending post 54b (see FIG. 2 also) over which the bearing 80 (not shown in FIG. 5) is sleeved. The flange 54 further includes an integrated valve body 145 which forms a portion of the flow control valve 92 previously mentioned. As will be discussed below, the valve body 145 includes a threaded inlet port (not shown in FIG. 6) that receives an adapter fitting 138 provided with a threaded nipple 140 for coupling with one end of the oil delivery line 94.

Figure 7:
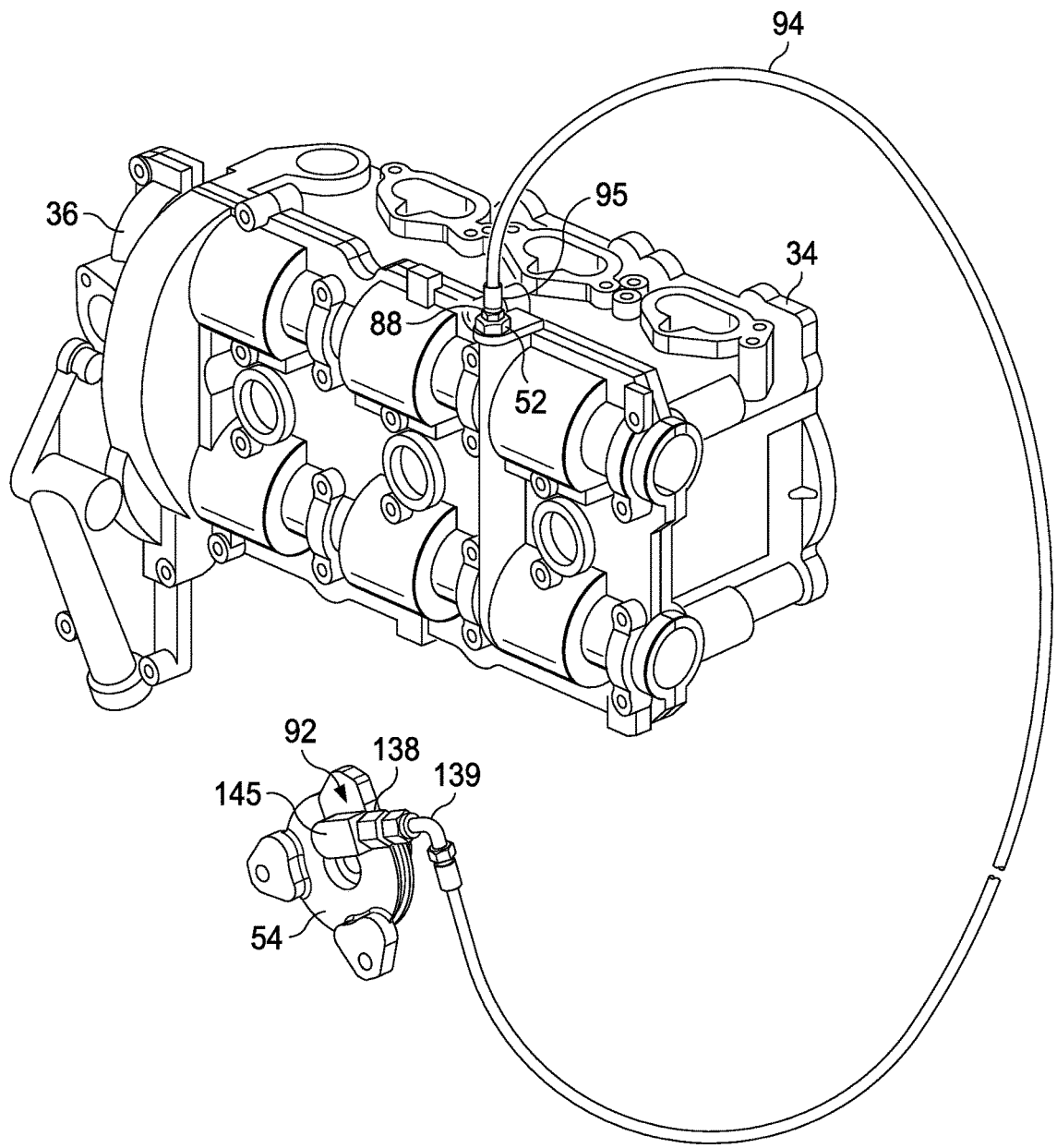
FIG. 7 is an illustration of a perspective of a direct oil feed system, coupled with an oil galley within a camshaft cover and cylinder head of the engine of FIG. 1.

Attention is now directed to FIG. 7 which illustrates connection of the flange 54 to an oil galley 50 (FIG. 1) within the cam cover 36 and head 34. In this example, the flow control valve 92 is integrated into the flange 54 however, in other embodiments, the flow control valve 92 may be coupled in-line with the oil delivery line at any point along its length, or alternatively, the flow control valve 92 may form part of, or integrated into a take-off fitting 95 that couples the oil delivery line 94 with port 52 on the cam cover 36 and head 34. In this example, the oil delivery line 94 is coupled with the flange 54 by an adapter fitting 138 and an elbow 139. The oil delivery line 94 may comprise any suitable flexible conduit capable of withstanding the typical levels of oil pressure in engine applications, including higher pressures used in high-performance engines.

Figure 9:
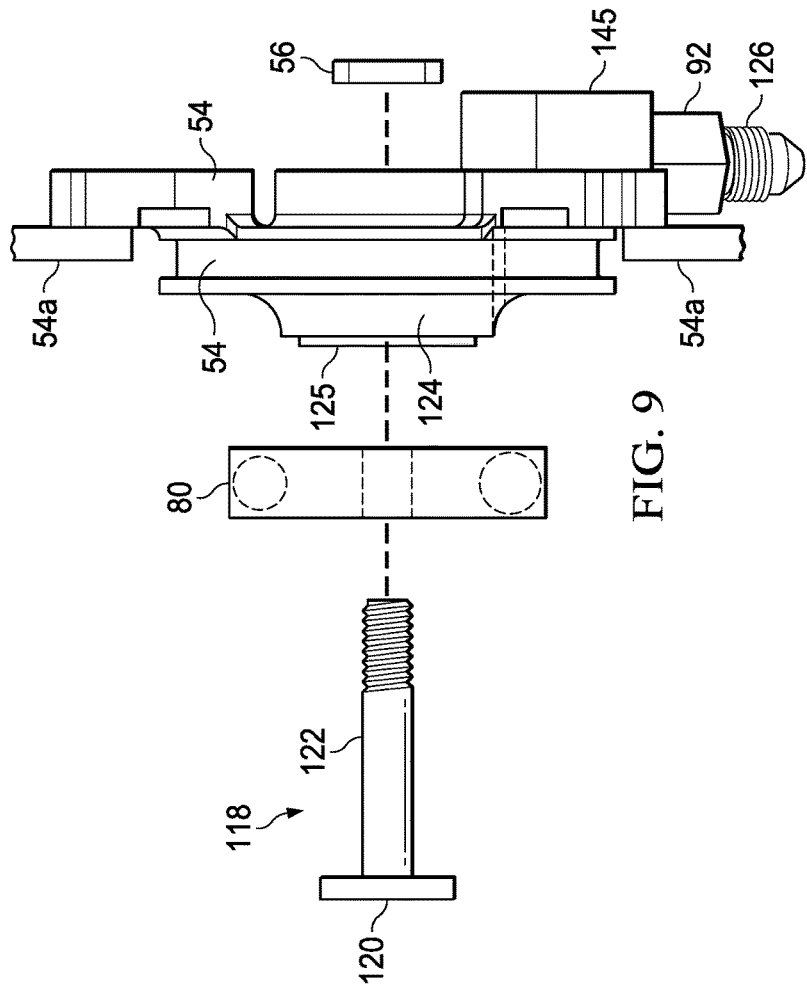
FIG. 9 is an illustration similar to FIG. 8 but exploded.
Figure 8:
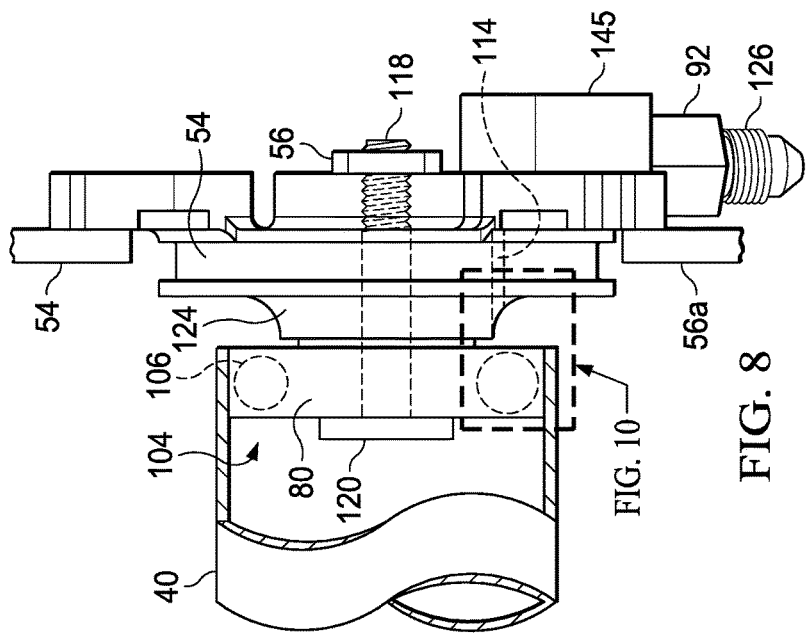
FIG. 8 is an illustration of a side view of one end of the layshaft, parts of the layshaft broken away to reveal a bearing mounting the layshaft for rotation on a flange.

FIGS. 8 and 9 illustrate additional details of the assembly that mounts and supports the end of the layshaft 40. In these Figures, an alternate embodiment of the flange 54 includes a chamfered land 124 having a central locator ring 25 which fits inside of the inner race 108 (FIG. 10) of the bearing 80. One side of the bearing 80 fits against the face of the land 124. The bearing 80 is held against the flange 54 by a retention bolt 118 that has having a shank 122 and a flat head 120. The outer end of the shank 122 is threaded to receive a nut 56. Tightening the nut 56 draws the head 120 of the retention bolt 118 against the bearing 80, which in turn draws the bearing 80 against the flange 54. The outer race 110 (FIG. 10) of the bearing 80 is received within the open end 104 of the layshaft 40, and may be retained therein by a snap ring (not shown) received within a groove (not shown) on the inside wall of the layshaft 40.

Figure 10:
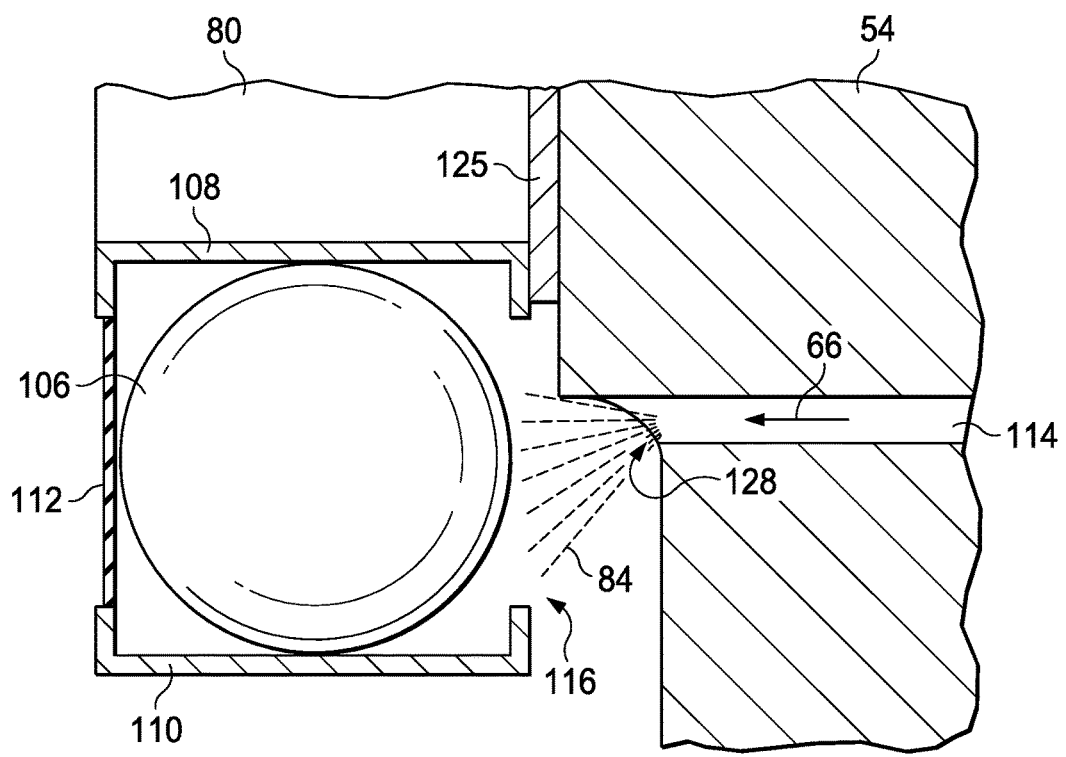
FIG. 10 is an illustration of the area designated as "FIG. 10" in FIG. 8, parts being broken away in section for clarity.
Figure 11:
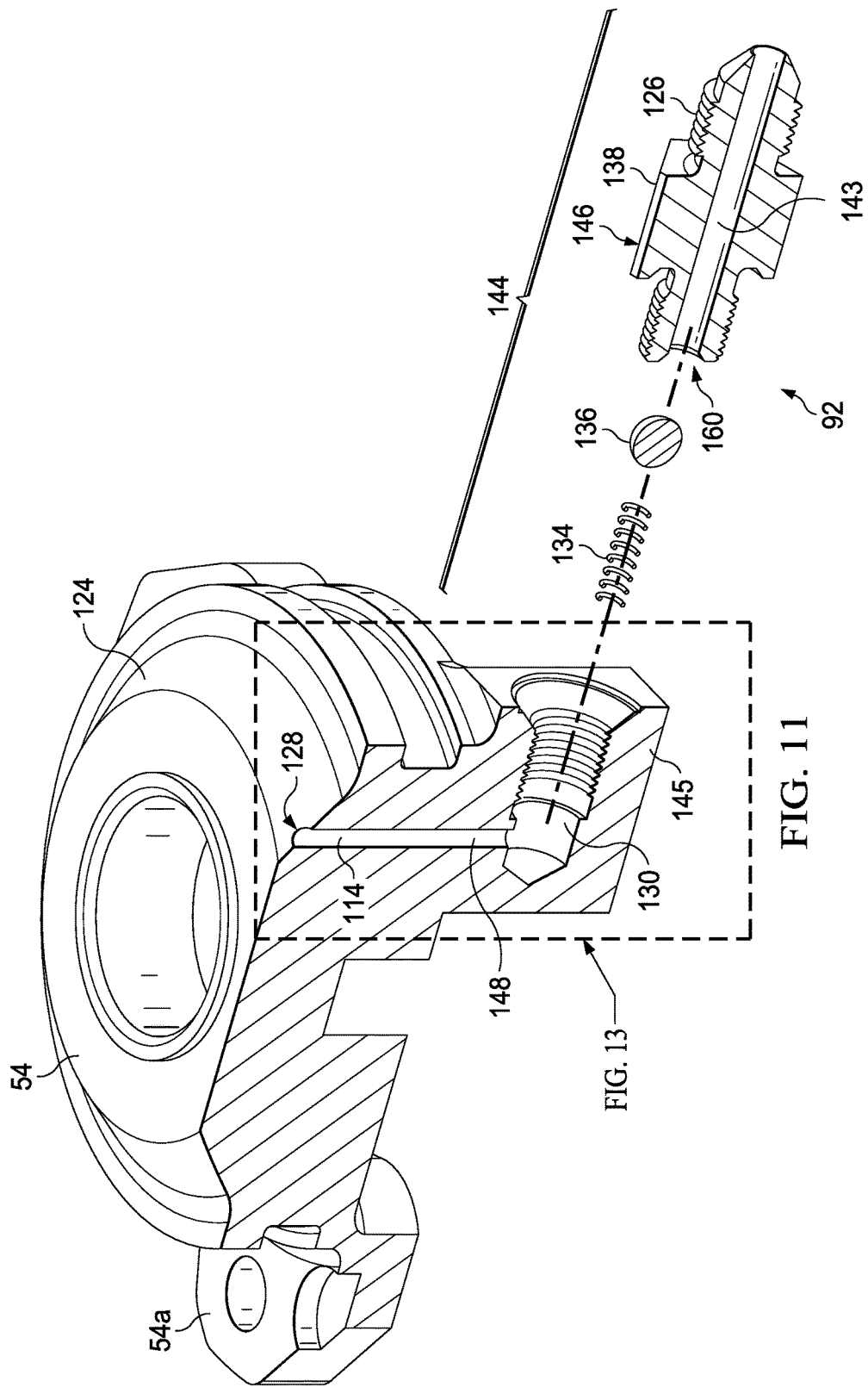
FIG. 11 is an illustration of exploded, perspective view of the flange and one form of a pressure responsive flow control valve, parts being cut away in section.
Figure 13:
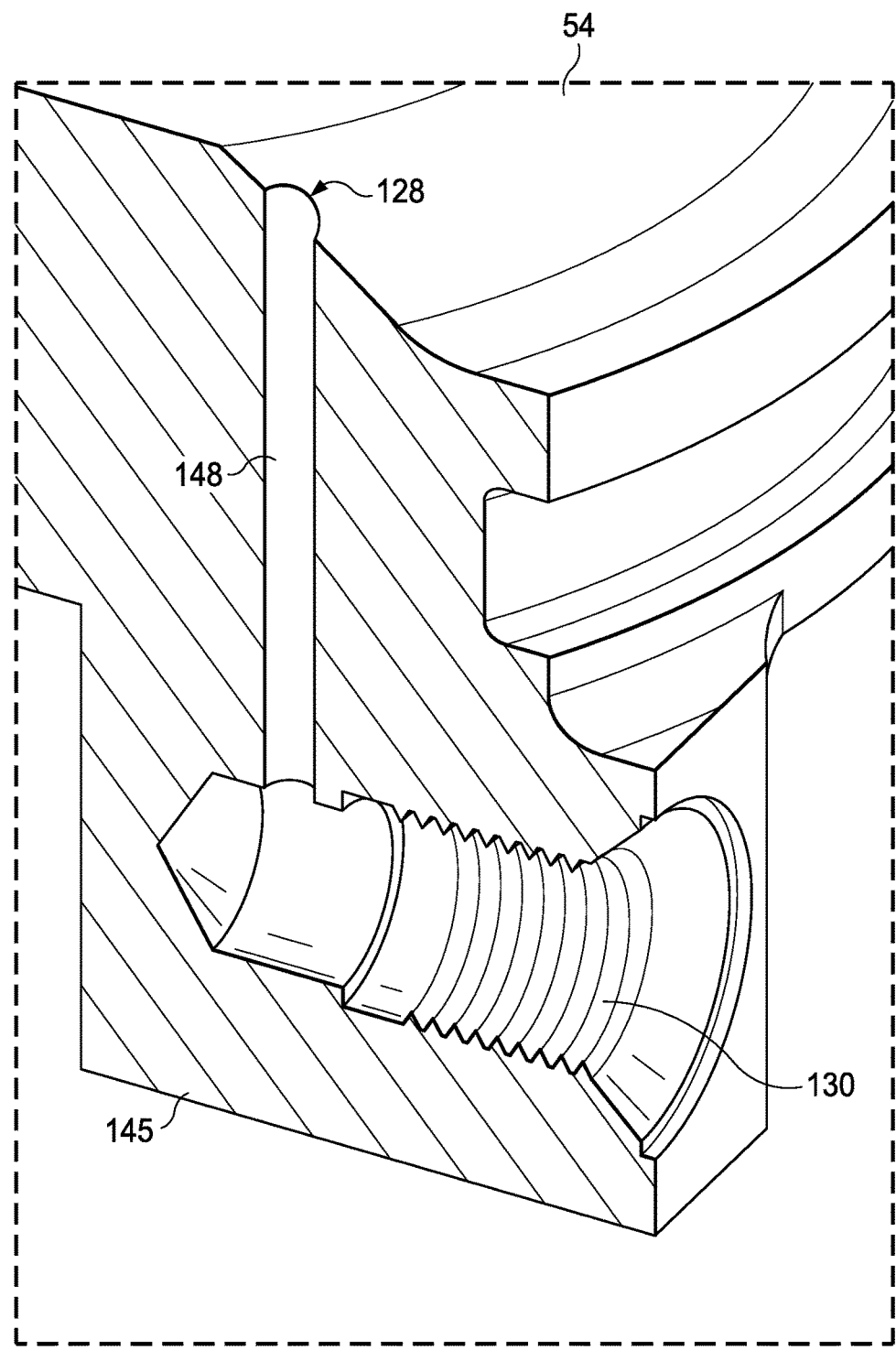
FIG. 13 is an illustration of the area designated as "FIG. 13" in FIG. 11.

Reference is now made to FIGS. 10, 11 and 13 which illustrate additional details of the flange 54 and flow control valve 92. In this embodiment, wherein the flow control valve 92 is integrated into the flange 54, the flange 54 has a threaded inlet port 130 in a valve body 145 that is integral with the flange 54. The interior of the inlet port 130 communicates with a channel 148 forming an oil passageway 114 that extends longitudinally, substantially perpendicular to both the longitudinal axis of the inlet port 130 and the plane (side) of the bearing 80. The oil passageway 114 terminates in an outlet port 128 in the land 124. As best seen in FIG. 10, the outlet port 128 is aligned with an open side 116 of the bearing 80 between the inner and outer races 108, 110 respectively. The other side of the bearing 80 is closed by a seal 112 to prevent escape of oil into the interior of the layshaft 40.

As best seen in FIG. 10, pressurized oil flows through the oil passageway 114 and is injected 84 directly into the open side 116 of the bearing 80. The injection 84 of the pressurized oil results in the oil covering bearing balls 106 and moving through the volume of space inside the bearing 80 between the inner and outer races 108, 110, thereby both cleansing and flushing this volume of contaminants while simultaneously lubricating the bearing 80.

Referring particularly to FIG. 11, the flow control valve 92 includes a valve 144 comprising an adapter fitting 138, a compression spring 134 and a ball 136. The inner threaded end of the adapter fitting 138 is threadably received within the threaded inlet port 130, and includes a ball seat 160. The outer end of the adapter fitting 138 includes a threaded nipple 126 that is adapted to be coupled with the oil delivery line 94. The compression spring 134 biases the ball 136 against the ball seat 160, normally maintaining the flow control valve 92 closed to prevent oil flow into the flange 54. However when the oil pressure in the oil delivery line 94 reaches a preselected level, the biasing force of the compression spring 134 is overcome, and the ball 136 moves away from the ball seat 160, opening the flow control valve 92 and allowing oil to flow into the flange 54 and injected into the bearing 80.

Figure 12:
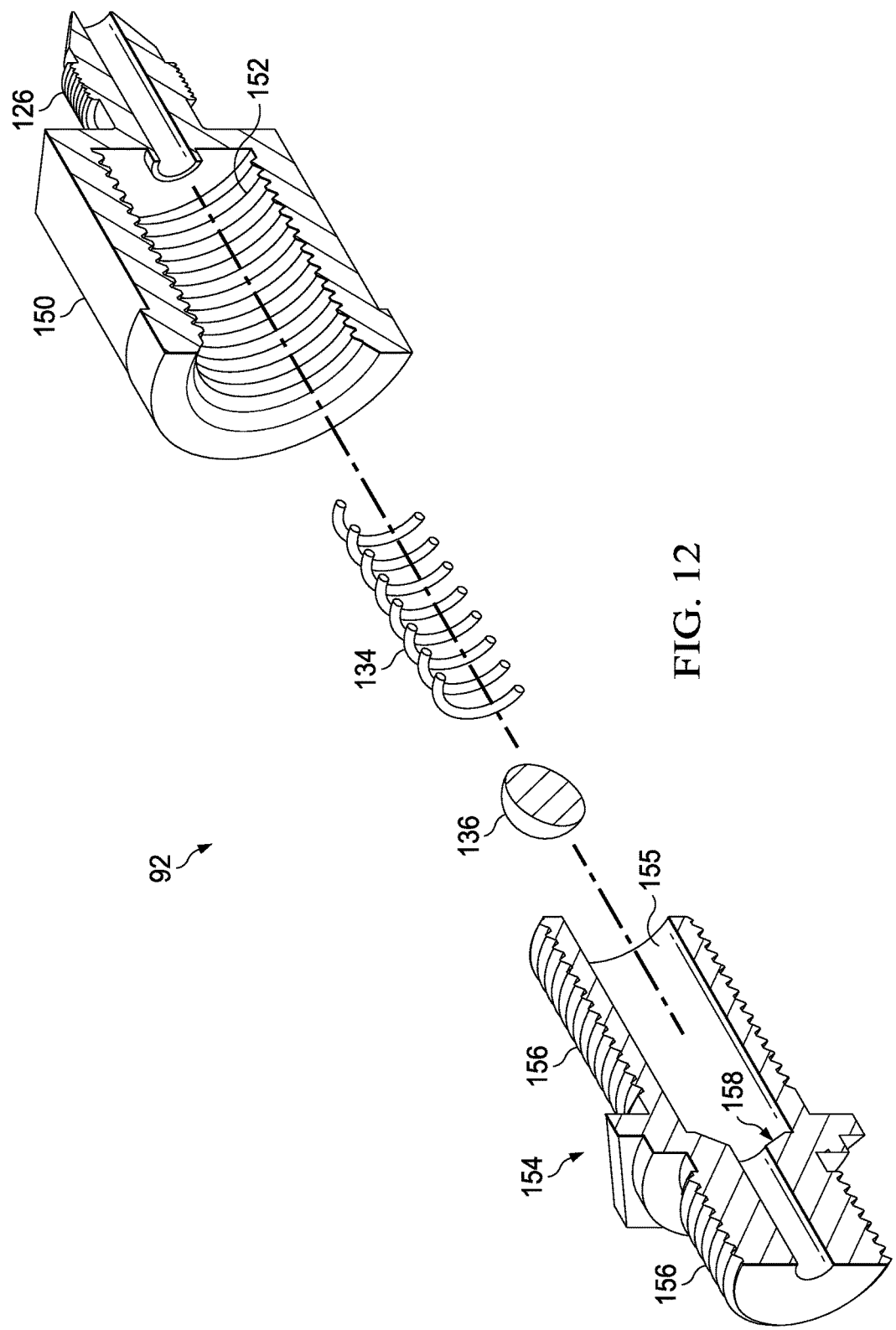
FIG. 12 is an illustration of exploded, perspective view of another form of the pressure responsive flow control valve.

As previously mentioned, the flow control valve 92 may optionally be installed at the point of oil take-off (FIG. 3). FIG. 12 illustrates another embodiment of the flow control valve 92 that is suitable for installation in the port 52 in the cam cover 36/head 34 or a similar port on the engine 30 that provides direct access to engine oil. As previously mentioned, it is desirable that the oil take-off derive oil that has been filtered and cooled, however it may be possible to install the flow control valve 92 at a location that is upstream of the point where the oil is either filtered or cooled. For example, the flow control valve 92 could be installed as a fitting on or near either the oil pump 68 or the oil filter 72.

The flow control valve 92 shown in FIG. 12 broadly comprises an adapter fitting 150, a valve body 154, a compression spring 134 and a valve ball 136. The adapter fitting 150 includes internal female threads 152 that receive male threads 156 on an end of the valve body 154. The outer end of the adapter fitting 150 includes a threaded nipple 126 which is adapted to be coupled with the oil delivery line 94. The valve body 154 also includes a male threaded end 156 that is threadably received within the port 52 on the cam cover 36, thereby mounting the flow control valve 92 directly on the cam cover 36. The compression spring 134 biases the valve ball 136 against a ball seat 158 on the valve body 154, normally holding the flow control valve 92 in its closed position until oil pressure overcomes the biasing influence of the compression spring 134, forcing the valve ball 136 away from the ball seat 158 and thereby permitting oil flow through the flow control valve 92, similar to the operation of the flow control valve 92 described earlier with reference to FIGS. 10, 11 and 13.

Figure 14:
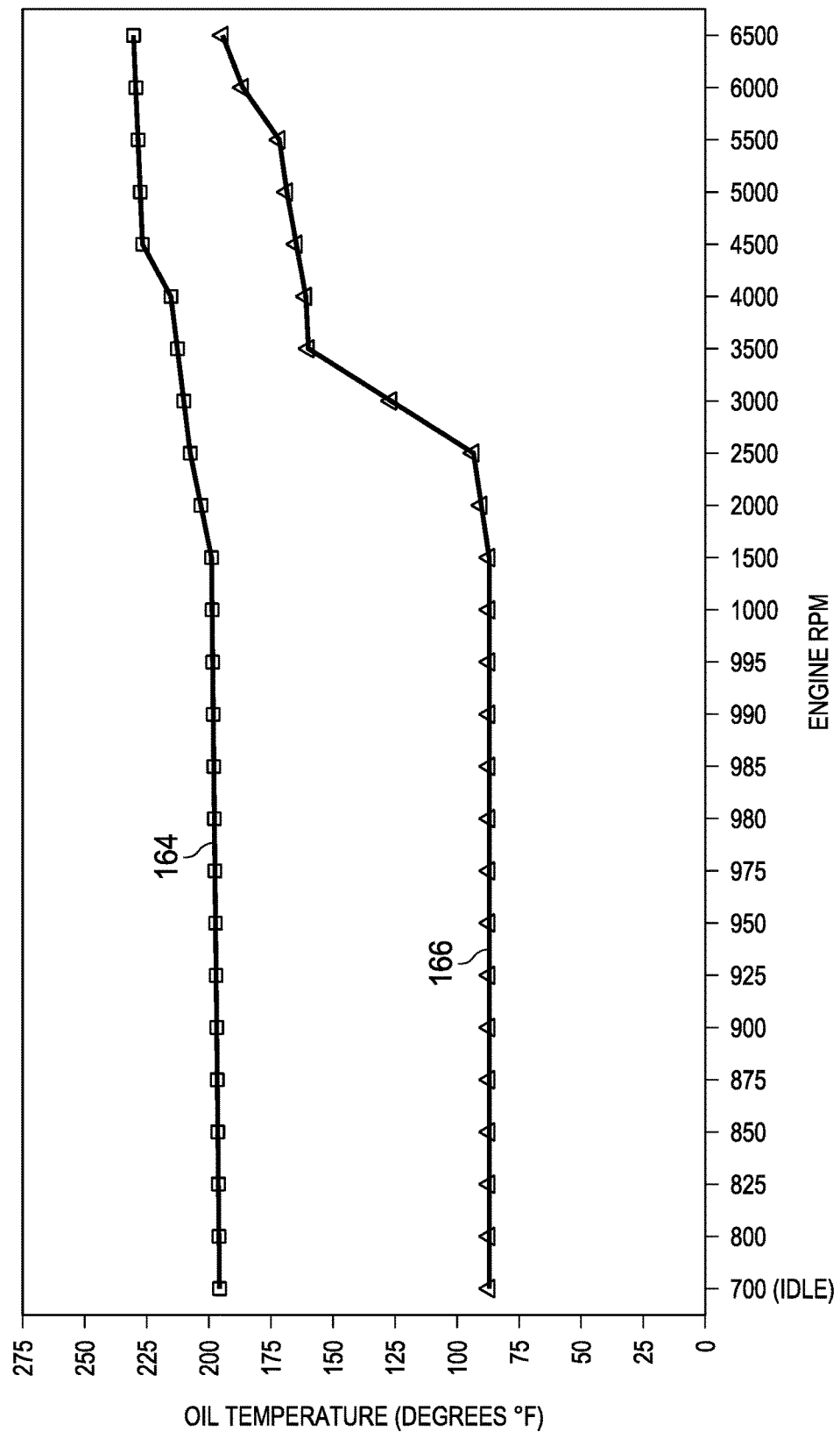
FIG. 14 is an illustration of a graph showing engine oil temperature at the sump, and engine oil temperature at the flange, as a function of engine RPMs.
Figure 15:
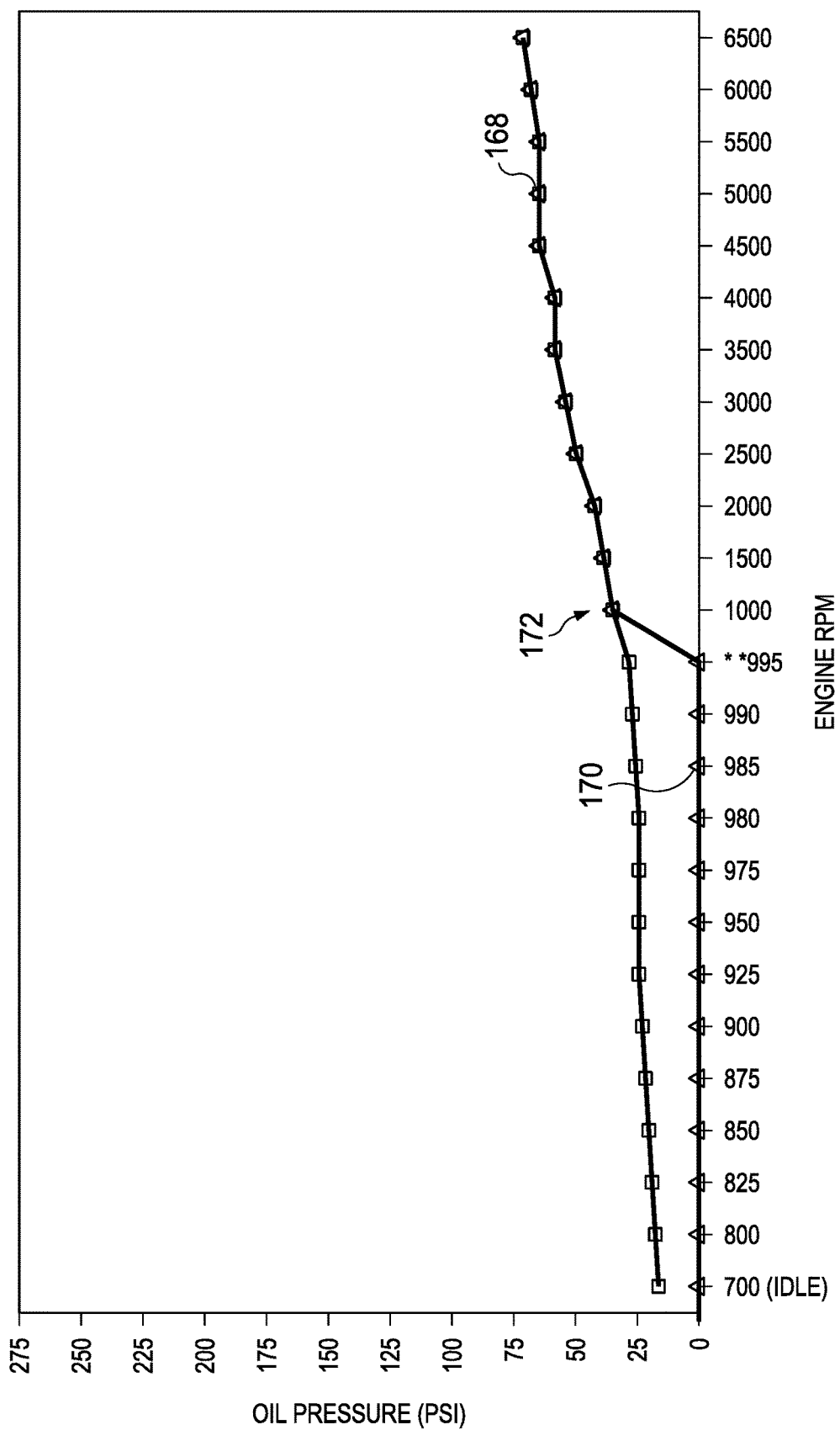
FIG. 15 is an illustration of a graph showing engine oil pressure and oil pressure through the flow control valve, as a function of engine RPMs.
Figure 16:
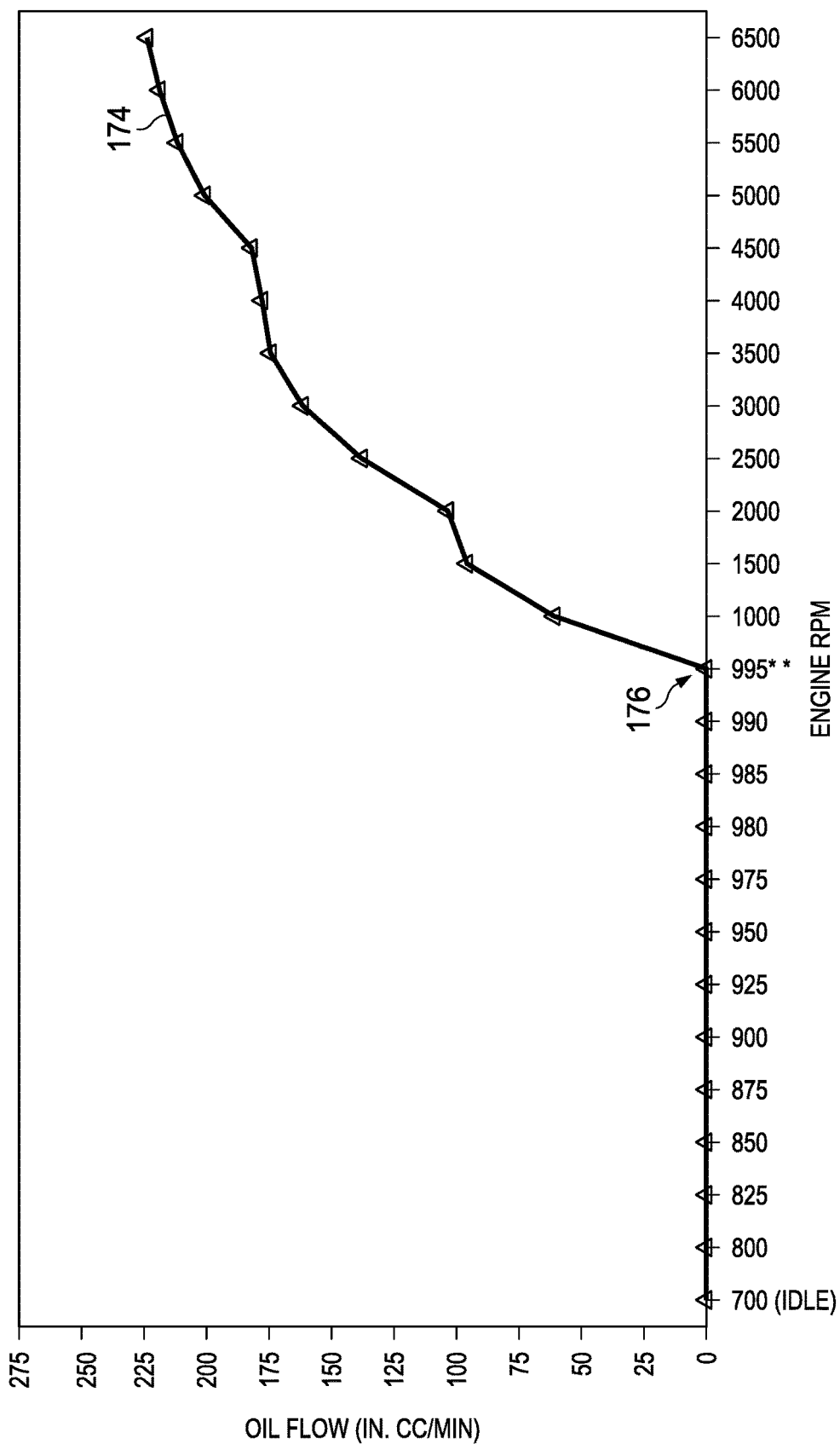
FIG. 16 is an illustration of a graph showing oil flow through the flow control valve, as a function of engine RPMs.

Attention is now directed to FIGS. 14-16 which illustrate various parameters of a typical internal combustion engine with opposing cylinders, which employs the flow control valve 92 configured as described above. The various parameters are shown as a function of engine RPMs. In FIG. 14, plots 164 and 166 respectively show temperature of the oil delivered to the flange 54, and temperature of oil in the oil sump 64 which is the same temperature of the oil pumped through the oil filter 72 (FIG. 3). From these plots, it may be appreciated that the temperature of the oil delivered to the bearing 80 is substantially less than the temperature of the oil in the oil sump 64 as a result of the oil delivery line and before being connected to an oil take-off 86 location (FIG. 3) that receives oil that has been cooled by an oil cooler 74.

FIG. 15 illustrates plots 168, 170 of oil pressure as a function of engine RPM, respectively present at the output of the oil pump 68, and at the outlet port 128 the flange 54. As can be seen from these plots, the oil pressure at the outlet port 128 remains at zero until an increase in engine RPMs causes the engine oil pressure to increase to a point that causes the flow control valve 92 to open. In example shown in FIG. 15, the flow control valve 92 opens (arrow 172) at between approximately 995 and 1000 RPMs. FIG. 16 shows a plot 174 of oil flow through the outlet port 128 in the flange 54 as a function of engine RPM. At approximately 995 RPMs, the flow control valve 92 opens, quickly allowing a spurt, and then continuous flow of oil through the outlet port 128 into the bearing 80.

Figure 17:
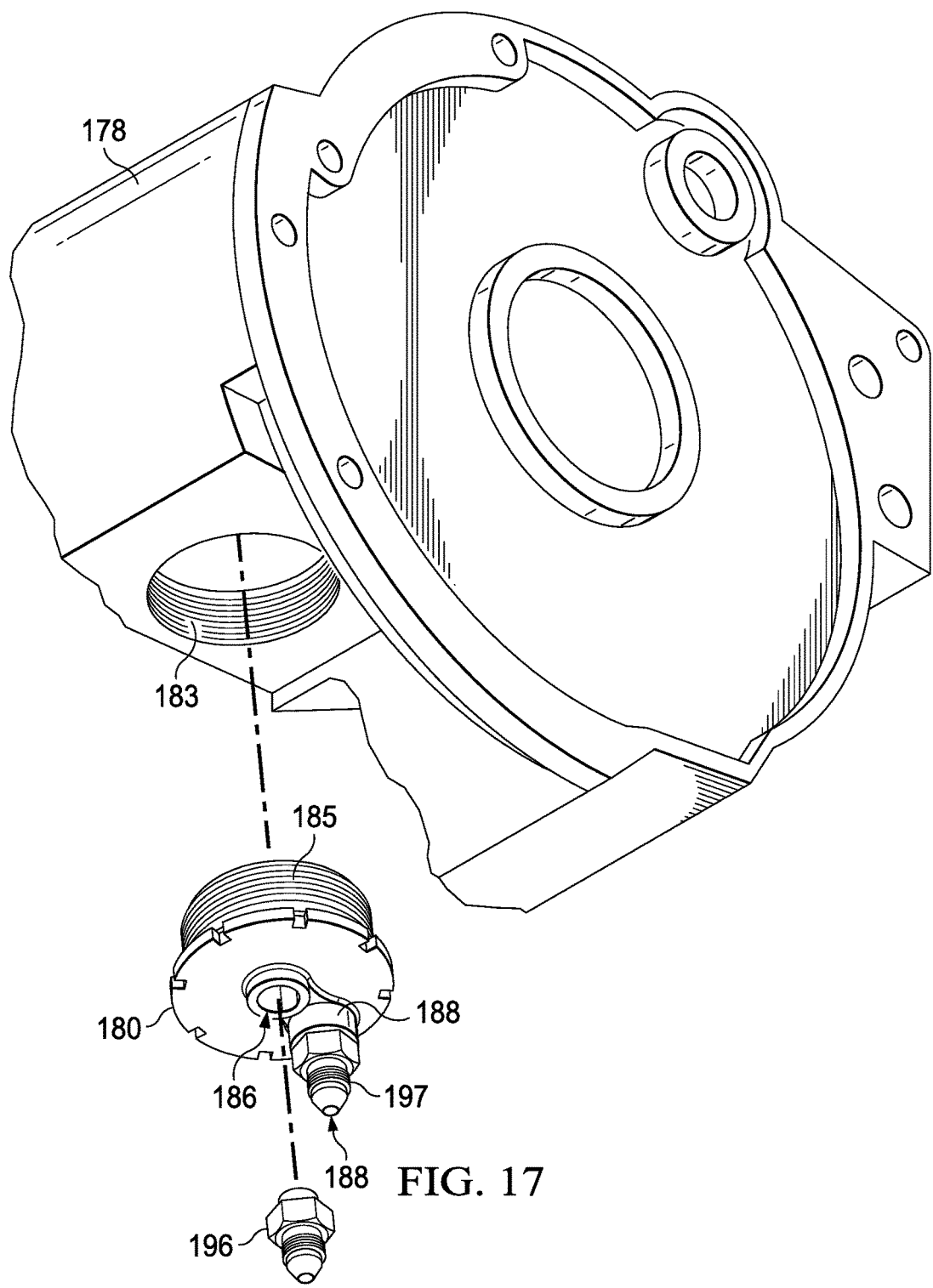
FIG. 17 is an illustration of a bottom fragmentary, exploded perspective view of the rear of the engine in FIG. 1, showing an adapter positioned in readiness for installation in an oil filter opening in the crankcase of the engine, one of the external fittings of the adapter being removed to expose an inlet port.
Figure 19:
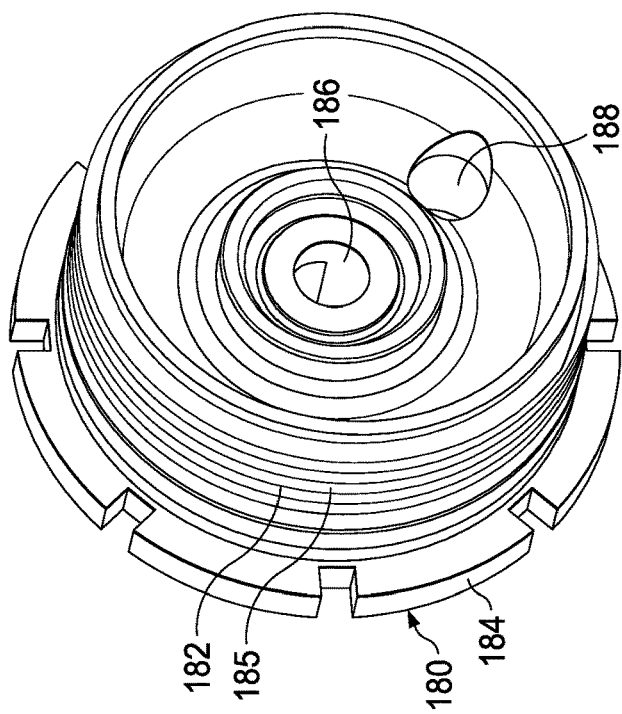
FIG. 19 is an illustration of a perspective view of the top of the adapter shown in FIG. 17.
Figure 20:
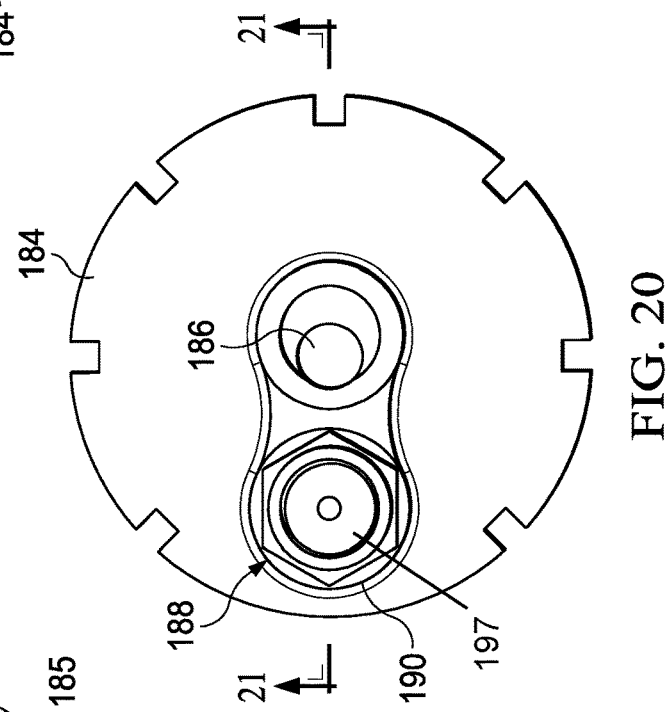
FIG. 20 is an illustration of a bottom plan view of the adapter shown in FIG. 17.
Figure 18:
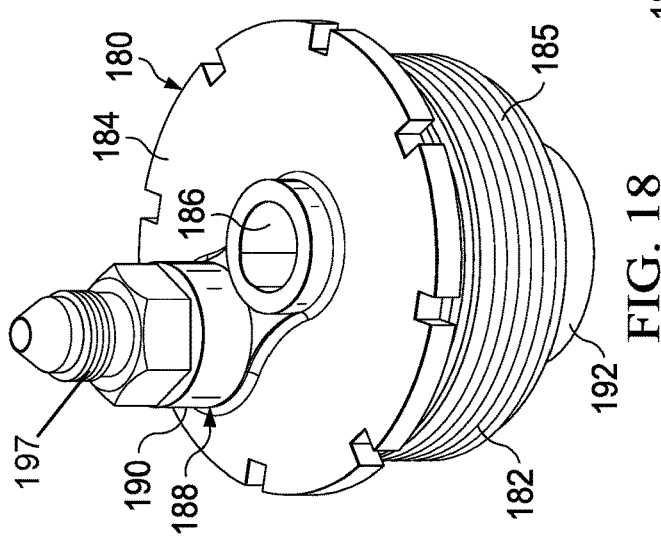
FIG. 18 is an illustration of a bottom, isometric view of the adapter shown in FIG. 17.
Figure 23:
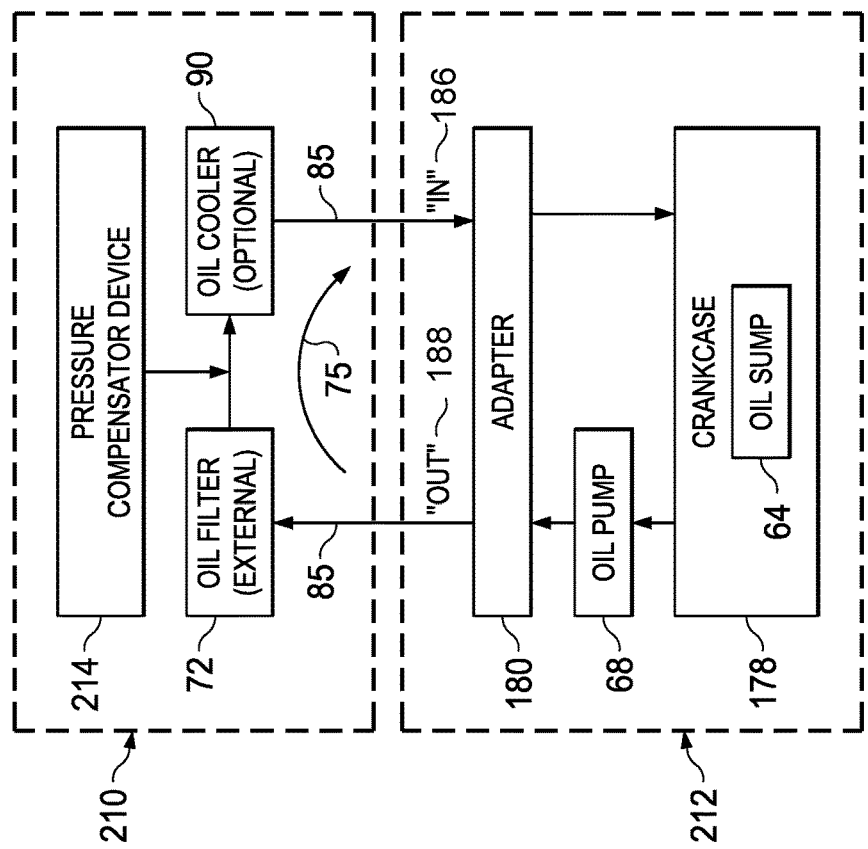
FIG. 23 is an illustration of a functional block diagram of an oil lubrication system employing the adapter shown in FIGS. 17-22.

Referring now to FIGS. 17 and 23, a lubrication system 82 for an internal combustion engine 30 includes a device in the form of an adapter 180, along with an oil pump 68, crankcase 178 and an oil sump 64 from which oil may be drawn by the pump 68. The adapter 180 functions to couple the internal oil lubrication system 82 of the engine with at least one external (outside of the crankcase 178) component or device that may be employed to treat, condition, improve and/or control engine lubrication, such as to compensate for oil pressure drops during certain engine operating conditions, and/or to filter and/or cool the engine's oil. For example, as shown in FIG. 23, the adapter 180 may be used to couple external components 210 such as an oil filter 72, a pressure compensator device 214 and an oil cooler 90, with oil lines 85 forming a loop 75 with the engine's internal oil lubrication system 212, such that oil is drawn from the sump 64 and is pumped by the oil pump 68 through the adapter 180 and then through the loop 75, back to the crankcase 178 of the engine 30. The adapter 180 includes an oil inlet port 186 and an oil outlet port 188 respectively provided with external fittings 196, 197 allowing them to be coupled with the external oil lines 85. As will be discussed below in more detail, in one embodiment, the adapter 180 is configured to replace an existing removable oil filter (not shown) in the crankcase 178 of the engine 30. More particularly, the illustrated embodiment of the adapter 180 is a screw-on adapter 180 that replaces a screw-on type crankcase oil filter (not shown) which screws into a threaded opening 183 in the crankcase 178. Thus, the adapter 180 may be easily retrofitted to engines having screw-on type oil filters, permitting one or more external components 210 to be added and connected with the engine's internal lubrication system 212. In other embodiments, the adapter 180 may be configured to replace nonscrew-on oil filters that are removably attached to the crankcase 178 by means other than threaded connections.

Depending upon the engine and vehicle application, the oil pressure in the engine 30 may temporarily drop to a level that may result in inadequate lubrication of certain engine components. For example, in race cars during heavy braking, acceleration or banking, the oil pump 68 may not be able to draw oil from the oil sump 64 because of shifting of the oil in the sump 64 during vehicle maneuvers. In order to avoid inadequate engine lubrication under these conditions, a commercially available external oil pressure compensator device 214 may be connected to the lubrication system 82 which functions to compensate for the temporary drop in oil pressure. Such pressure compensator devices 214 normally hold a quantity of oil under pressure which is released into the lubrication system 82 upon detection of low engine oil pressure, thereby compensating for the oil pressure drop. As can be seen in FIG. 23, in the illustrated application, the oil pressure compensator device 214 is coupled in the external oil circulation loop 75, and delivers oil under pressure to the crankcase 178 in order to maintain sufficient oil in the oil sump 64 when low engine oil pressure is detected.

A problem may occur, however, when the pressure compensator device 214 injects oil into the external loop and the oil pump 68 is producing inadequate oil pressure. Under these conditions, the pressure of the oil injected by the compensator device 214 is greater than that of the oil output from the oil pump 68. Consequently, some of the oil injected by the compensator device 214 may flow backward in the loop 75 toward the oil pump 68, rather than forward in the loop 75 toward the crankcase 178. This backward flow of oil reduces the effectiveness of the pressure compensator device 214, since the amount of injected oil delivered to the crankcase 178 is reduced by the amount of the backflow. In order to avoid this problem, the adapter 180 includes provision for preventing oil backflow through the outlet port 188 of the adapter 180 toward the oil pump 68. The problem of oil backflow may also occur in applications where a compensator device 214 is not utilized to compensate for drops in oil pressure. For example, under certain engine operating conditions previously described, the pressure of the oil at the output of the oil pump 68 may be less than the pressure of the oil in the external components 210 (due to gravity or other factors), thereby resulting in an oil pressure gradient that causes oil to flow from the external components 210 back to the oil pump 68.

Attention is now directed to FIGS. 17-22 which illustrate additional details of one embodiment of the adapter 180. The adapter 180 includes a substantially solid adapter body 182 having external threads and an integrated cover plate 184 configured to be engaged by an installation/removal tool used to install and remove the adapter 180 from the crankcase 178. The cover plate 184 acts as a stop and seats against the crankcase 178. The adapter 180 further includes an internal valve 190 in the body 182 that is coupled with the outlet port 188. As will be discussed below, the valve 190 acts as a one-way or check valve that allows oil to freely flow through the adapter 180 and exit the outlet port 188 under normal operating conditions, while preventing oil backflow through the adapter 180 when the pressure of the oil produced by the oil pump 68 falls below a preselected level. The adapter 180 may further include an optional adapter tube 192, the purpose of which will be discussed below.

In the illustrated example, the threaded adapter body 182 is configured to be threadably received within the internally threaded opening 183 in the engine crankcase 178, which is often provided in the crankcase 178 to receive a screw-on type engine oil filter (not shown). Thus, the adapter 180 can be readily installed and retrofitted to a wide variety of engines that employ screw-on type oil filters, simply by removing the existing filter, screwing on the adapter 180 in place of the filter, and relocating the oil filter elsewhere as an external component 210 in the loop 75. However, while the illustrated application provides an external oil filer and/or oil cooler (FIG. 23), in other embodiments, the adapter 180 may be configured to have the oil filter screwed or otherwise directly coupled thereto. For example, the adapter 180 may have a fitting (not shown) into which a conventional oil filter (not shown) may be screwed or otherwise attached in-line, such that oil flows through the adapter 180, then through the filter and is returned through the adapter 180 to the crankcase 178. In still other embodiments, the adapter 180 may be coupled downstream in the external oil flow loop 75.

Figure 21:
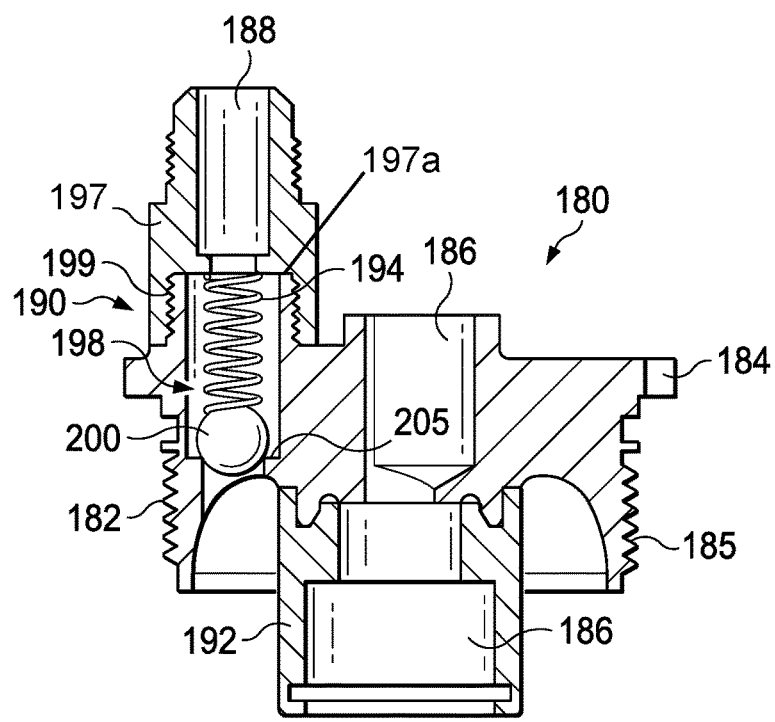
FIG. 21 is an illustration of sectional view of the adapter taken along the line 21-21 in FIG. 20.
Figure 22:
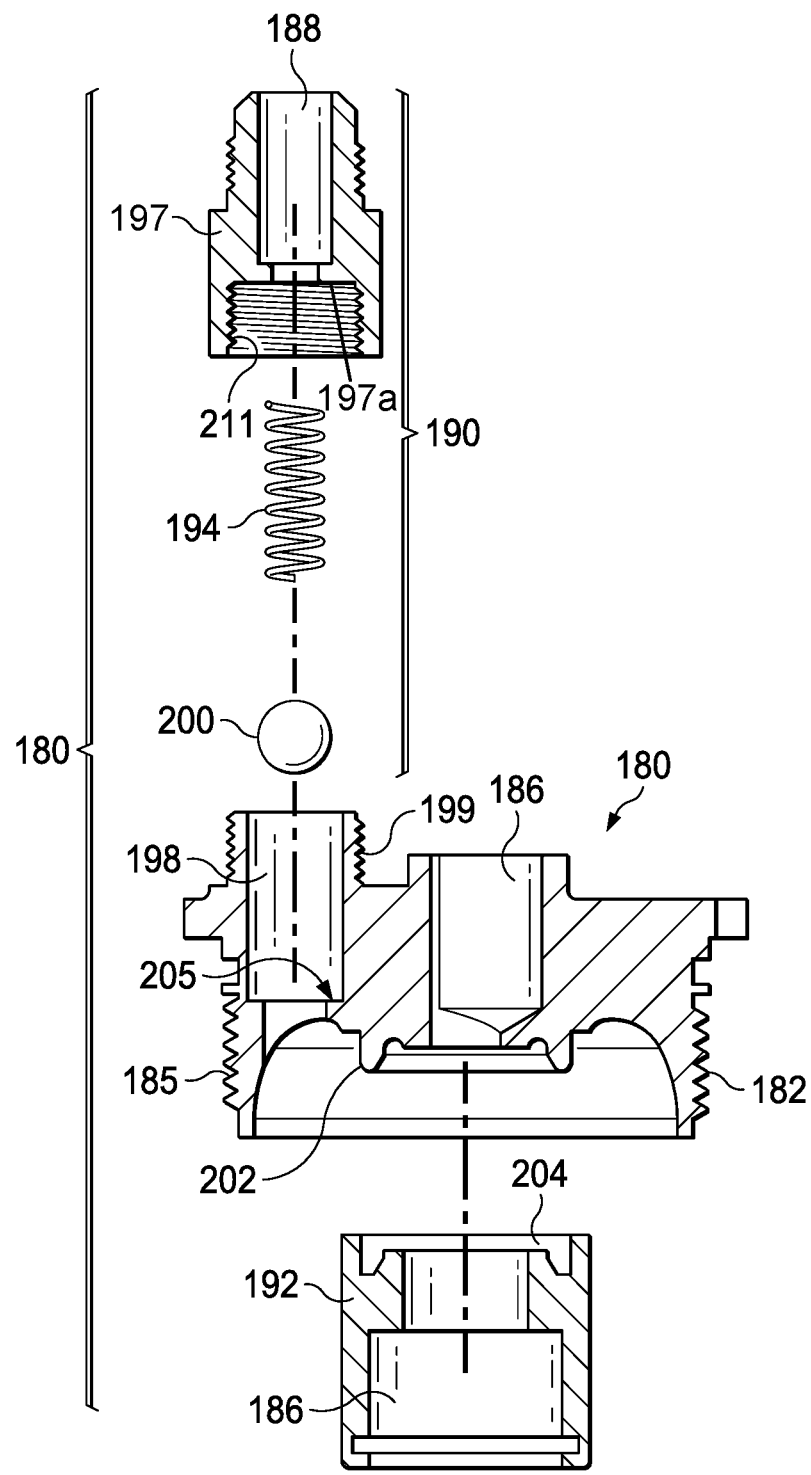
FIG. 22 is an illustration similar to FIG. 21, but exploded to show the component parts of the device.

Referring particularly to FIGS. 21 and 22, the valve 190 comprises a cylindrically shaped internal passageway 198 in the adapter body 182, a compression spring 194 and a valve ball 200. The external valve fitting 197 has internal threads 211 allowing it to be threaded onto a threaded nipple extension 199 on the adapter body 182. The spring 194 is captured within the passageway 198, between the ball 200 and an end wall 197a within the interior of the external fitting 196. The valve ball 200 is captured between the spring 194 and a valve seat 205 integrally formed in the adapter body 182. The spring 194 biases the ball 200 toward the valve seat 205 in order to prevent oil backflow. Under normal operating conditions, oil pumped out from the crankcase 178 flows through passageway 198 (FIG. 21) in the valve 190 and then out through the outlet port 188 in the fitting 197 to the previously mentioned external components 210 (FIG. 23) before being delivered through the loop 75 back into the inlet port 186 of the adapter 180. Oil looping back through the inlet port 186 of the adapter 180 flows through the crankcase 178, back to the oil sump 64, before being pumped by the oil pump 68 out through the outlet port 188 to the external components 210.

Under normal operating conditions when the output pressure from the oil pump 68 is within predetermined desired pressures, the oil pressure produced by the oil pump 68 is sufficient to hold the ball 200 in its open, unseated position away from its valve seat 205, overcoming the biasing influence of the spring 194, and allowing oil to flow through the passageway 198 out through the outlet port 188 to the external components 210. However, in the event the oil pressure at the outlet port 188 is greater than the oil pressure produced by the oil pump 68, the higher pressure at the output port 188, assisted by the spring 194, forces the ball 200 against its valve seat 205, thereby closing the valve 190 and preventing the return of oil (oil backflow) through the adapter 180. As previously explained, the oil pressure compensator device 214 may be responsible for encouraging oil backflow during periods of low oil pressure from the oil pump 68 because of the pressurized oil it releases into the lubrication system. However as previously mentioned, there may be other applications not using a pressure compensator device 214 where oil backflow through the adapter 180 caused by other factors is prevented by the valve 190.

It should be noted here that in some applications, the spring 194 may not be required, depending on the configuration of the engine 30 and the orientation of the adapter 180. For example, in some applications, the force of gravity acting on the ball 200 may be sufficient to bias the ball 200 to move to its closed position against the valve seat 205 to prevent backflow of oil through the valve 190 when the oil pressure drops below a predetermined pressure.

The optional, cylindrically shaped adapter tube 192 mentioned above may be required to couple the adapter 180 to internal components within the crankcase 178. The adapter tube 192 includes an annular recess 204 that receives a ring-shaped indexing land 202 on the body 182.

Figure 21B:
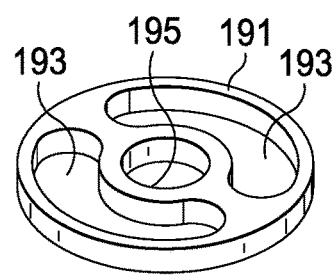
FIG. 21B is an illustration of a perspective view of a perforated disk forming part of a valve in the adapter shown in FIG. 21A.
Figure 21A:
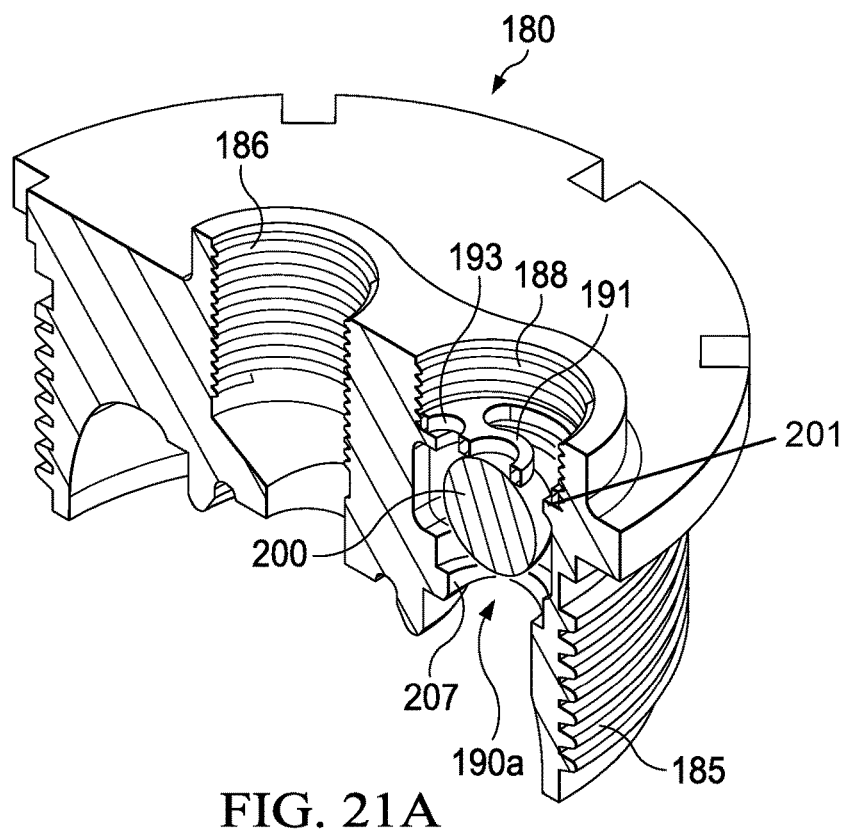
FIG. 21A is an illustration of a bottom perspective view, cut away in section, of an alternate embodiment of the adapter.
Figure 21D:
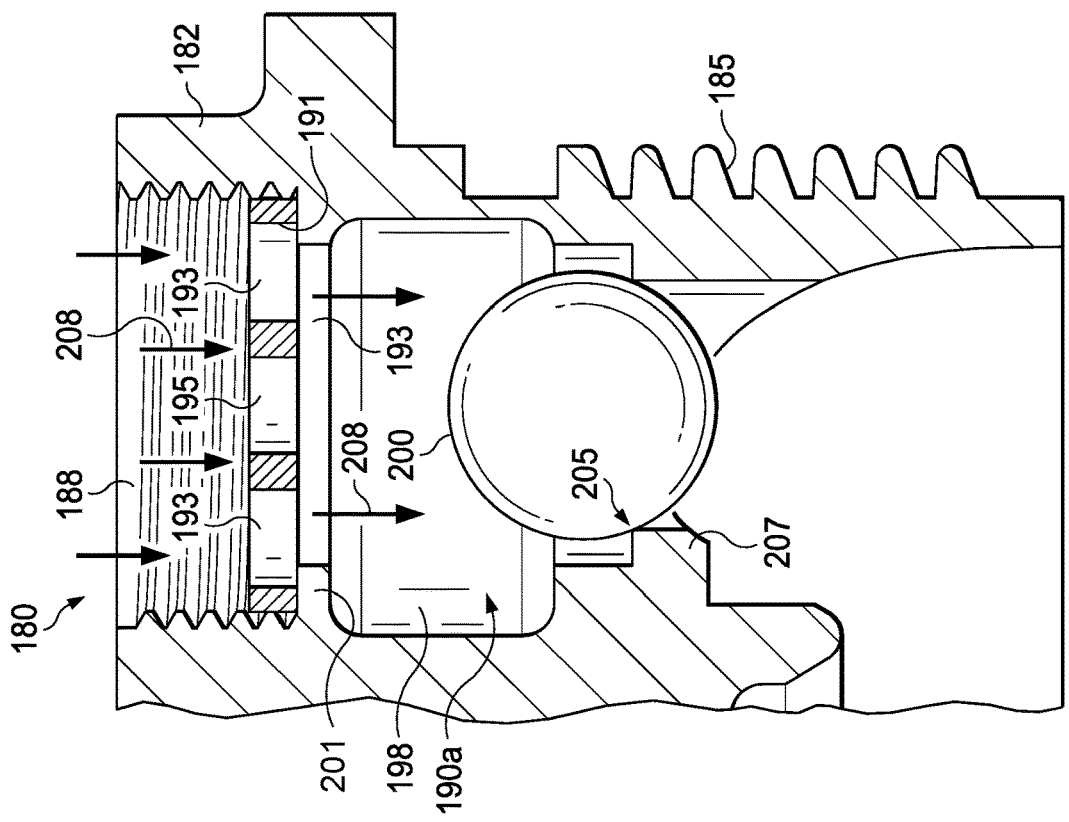
FIG. 21D is an illustration similar to FIG. 21C, but wherein the valve has shifted to a closed position to prevent oil backflow.
Figure 21C:
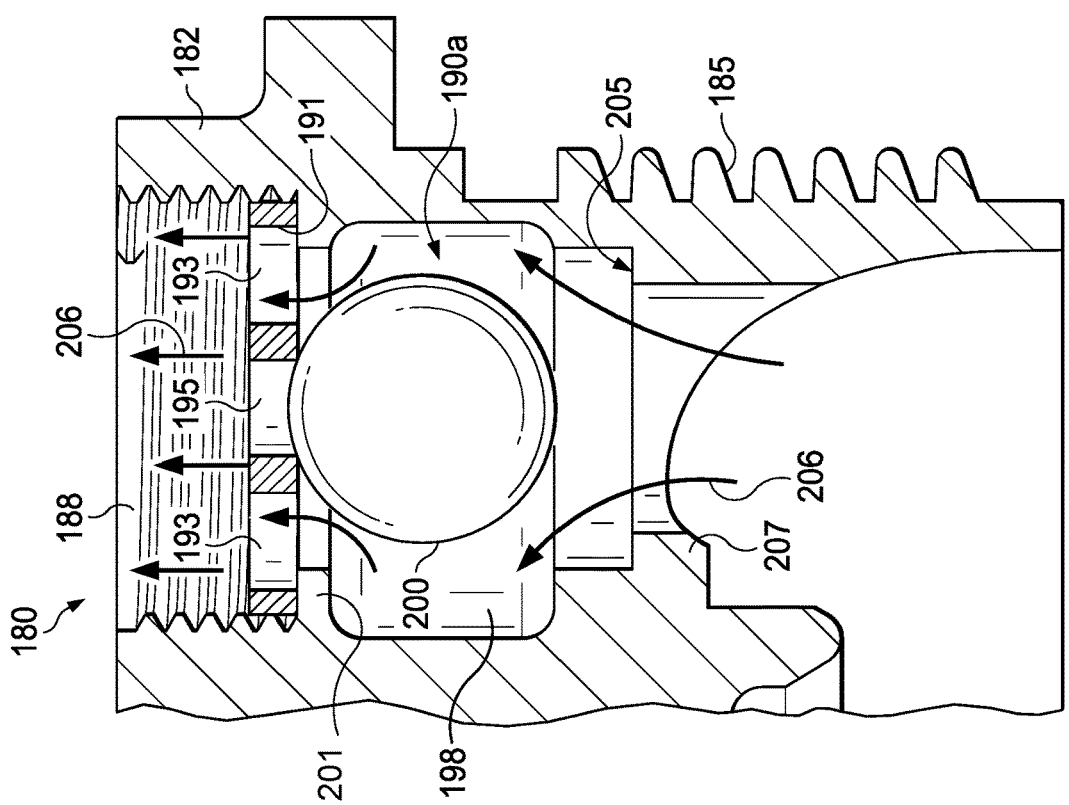
FIG. 21C is an illustration of a cross sectional view of the valve shown in FIG. 21A, showing the valve in an open position during normal engine operating conditions.

FIGS. 21A and 21B illustrate an alternate embodiment of the adapter 180 having another form of the valve 190a, wherein a washer-like, circular perforated disk 191 is used rather than the spring 194 to control oil flow through the valve 190a. The perforated disk 191 includes a central circular opening 195 that is adapted to engage and seat against the ball 200, and lateral perforations 193 on the sides of the circular opening 195. Other opening configurations are possible. The disk 191 is positioned against an annular, shelf-like protrusion 201 in the body 182, at one end of the passageway 198. The ball 200 is shiftable within the passageway 198 between the perforated disk 191 and a valve seat 205 (FIGS. 21C and 21D) defined by an annular shoulder 207 in the body 182 at the other end of the passageway 198.

Under normal operating conditions, oil flowing through the passageway 198 toward the outlet port 188 under sufficient pressure forces the ball 200 away from its valve seat 205, keeping the valve 190a open. This normal oil flow moves the ball 200 toward the disk 191 and seats it within the central opening 195 in the disk 191, thereby closing the central opening 195. Although the ball 200 effectively closes the central opening 195, oil is allowed to flow 206 (FIG. 21C) around and past the ball 200 through the perforations 193 on opposite sides of the ball 200. However, in the event of a sufficient drop in oil pressure, oil attempting to flow 208 backward (FIG. 21D) from the outlet port 188 through the passageway 198 moves the ball 200 away from the disk 191 and forces it down onto its valve seat 205, thereby closing the valve 190a to prevent oil backflow.

As may be appreciated from the foregoing description, a method is provided of readily adapting and retrofitting the lubrication system of an internal combustion engine 30 with one or more external components 210 such as an oil filter 72, oil cooler 90, a pressure compensating device 214, etc., without the need for altering the engine's crankcase 178 or using specialized fittings. The method includes removing an existing crankcase oil filter from the engine 30, and replacing it with the adapter 180 by screwing it into the crankcase 178 in place of the oil filter. One or more external components 210 may then be connected via oil lines directly to the inlet and outlet ports 186, 188 of the adapter 180. Potential oil backflow during periods of low oil pressure that may be caused in part by the use of external components 210 is prevented by the internal valve 190/190a in the adapter 180.

Figure 24:
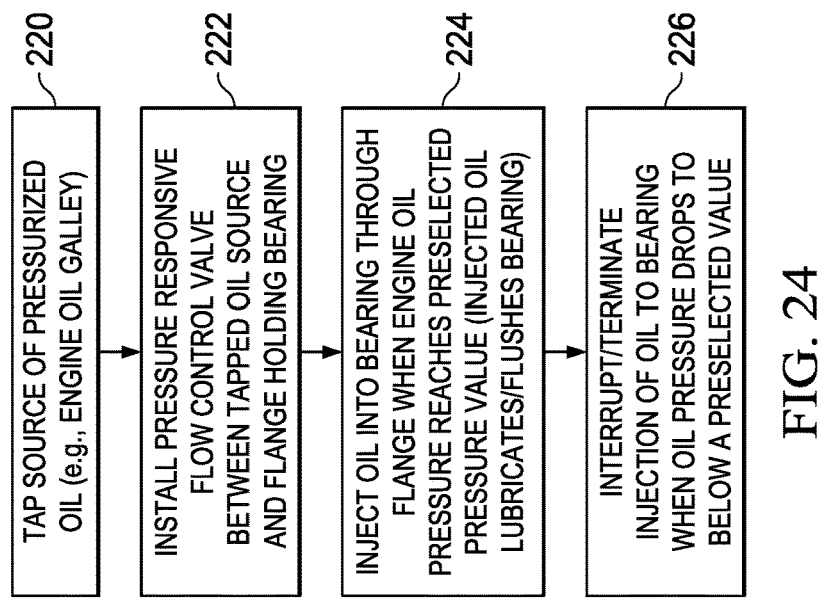
FIG. 24 is a flow diagram of a method of controlling lubrication of a bearing in an internal combustion engine.

FIG. 24 broadly illustrates the overall steps of a method of controlling lubrication of a bearing in an internal combustion engine 30. At 220, a source of pressurized oil is tapped, such as oil galley 50 in the engine 30. At 222, a pressure responsive flow control valve 92 is installed between the tapped oil source and a flange 54 holding the bearing 80. At 224, oil is injected into the bearing 80 when engine oil pressure reaches a preselected pressure value. The resulting injection of oil both lubricates bearing 80 and flushes it of contaminants. The injection of oil into the bearing 80 is interrupted or terminated when the engine oil pressure drops to below the preselected pressure value.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An adapter for allowing circulation of oil between an internal combustion engine and an external component outside the engine, comprising:
a substantially solid adapter body configured to be attached to the engine and having a passageway therein through which oil may flow from the engine to the external component, the adapter body including an integrated cover plate configured to act as a stop and seat the adapter against a surface of the engine; and
an internal valve within the adapter body for controlling flow of oil between the engine and the external component, the valve including a valve seat integrally formed in the adapter body within the passageway, the valve further including a valve ball shiftable between an unseated position allowing oil to flow from the engine through the passageway to the external component and a seated position against the valve seat preventing backflow of oil through the passageway from the external component to the engine.

2. A device for coupling an oil lubrication system of an internal combustion engine with at least one external component, wherein the internal combustion engine includes a crankcase provided with an screw-on oil filter, comprising:
a screw-on adapter body configured to replace the oil filter, the screw-on adapter body including —
an internal passageway through which oil may flow from the crankcase to the external component,
an oil outlet port coupled with the internal passageway and configured to be coupled with the external component for supplying oil to the external component,
an oil inlet port configured to be coupled with the external component for receiving oil from the external component,
a set of external threads configured to be screwed into the crankcase, and
an integrated cover plate configured to act as a stop and seat the adapter body against the crankcase, the cover plate having features configured to be engaged by a tool used to remove the adapter body from the crankcase; and
a one-way valve for controlling flow of oil between the external component and the crankcase, the one way valve including —
a valve seat defined in the adapter body and located at a first end of the passageway,
a valve ball shiftable within the passageway between a seated position against the valve seat preventing backflow of oil from the external component to the crankcase, and an unseated position allowing the flow of oil from the crankcase to the external component, and
an external fitting removably attached to the adapter body and located at a second end of the passageway opposite the first end.

* * * * *